(12) United States Patent
Qi et al.

(10) Patent No.: US 6,582,854 B1
(45) Date of Patent: Jun. 24, 2003

(54) LITHIUM ION SECONDARY BATTERY, CATHODE ACTIVE MATERIAL THEREFOR AND PRODUCTION THEREOF

(75) Inventors: Lu Qi, Osaka (JP); Gohei Yoshida, Osaka (JP); Kazuhiko Hirao, Osaka (JP); Yukinori Honjo, Osaka (JP)

(73) Assignee: The Honjo Chemical Corporation, Osaka (JP)

( * ) Notice: Subject to any disclaimer, the term of this patent is extended or adjusted under 35 U.S.C. 154(b) by 0 days.

(21) Appl. No.: 09/662,979

(22) Filed: Sep. 15, 2000

(30) Foreign Application Priority Data

Dec. 2, 1999 (JP) ............................. 11-343177
Jul. 13, 2000 (JP) ........................ 2000-212819

(51) Int. Cl.$^7$ ................................. H01M 4/24
(52) U.S. Cl. ................................. 429/231.95
(58) Field of Search ..................... 429/218.1, 231.95

(56) References Cited

U.S. PATENT DOCUMENTS

| | | | | |
|---|---|---|---|---|
| 5,407,762 A | * | 4/1995 | Mitate et al. ............. | 429/197 |
| 5,609,975 A | * | 3/1997 | Hasegawa et al. ......... | 429/217 |
| 6,007,947 A | * | 12/1999 | Mayer ...................... | 429/223 |
| 6,127,065 A | * | 10/2000 | Yamamoto et al. ....... | 429/218.1 |
| 200,704 A1 | * | 3/2001 | Katz et al. .............. | 429/218.1 |
| 6,284,405 B2 | * | 9/2001 | Kaido et al. .............. | 429/94 |

FOREIGN PATENT DOCUMENTS

JP      411067205 A   *   3/1999   ........... H01M/4/04

* cited by examiner

*Primary Examiner*—Patrick Ryan
*Assistant Examiner*—Monique Wills
(74) *Attorney, Agent, or Firm*—Merchant & Gould P.C.

(57) ABSTRACT

A substituted lithium cobalt composite oxide for use as a cathode active material in a lithium ion secondary battery, which has the general formula:

$$Li_xM_yCo_{1-y}O_2$$

in which M represents at least one metallic element selected from the group consisting of Ti, Mo and; x is a numeral in the range of 0.8 to 1.2; and y is a numeral in the range of 0.001 to 0.10.

6 Claims, 6 Drawing Sheets

LITHIUM ION SECONDARY BATTERY, CATHODE ACTIVE MATERIAL THEREFOR AND PRODUCTION THEREOF

FIELD OF THE INVENTION

This invention relates to a lithium ion secondary battery, a cathode active material therefor comprised of a lithium cobalt composite oxide and a method for the production of the composite oxide. More particularly, the invention relates to a lithium ion secondary battery which comprises a lithium cobalt composite oxide containing a substitution element as a cathode active material and which has improved cycle characteristics and thermal stability, the lithium cobalt composite oxide as a cathode active material and a method for the production of the composite oxide.

DESCRIPTION OF PRIOR ART

Backed by the recent demands for small sized and high performance electronic appliances, the demand for safe, high voltage, high energy density and light-weight lithium ion secondary batteries having a long life rapidly increases. Investigation is also intensively made to put lithium ion secondary batteries to practical use in the field of large scale electric power storage systems or electric mobiles to cope with world-wide decrease in resources and environmental pollution.

A lithium cobalt composite oxide ($LiCoO_2$, lithium cobaltate) has been so far widely used as a high performance cathode active material of lithium ion secondary batteries since it has a 4 volt high voltage and high energy density. However, when such a lithium ion secondary battery is subjected to repetition of charge and discharge process, the crystal structure of lithium cobalt composite oxide is gradually destroyed to fail to function as a cathode active material and hence the battery has no satisfactory cycle performance.

Furthermore, since the lithium cobalt composite oxide decomposes at a temperature of about 200° C., there is a fear that the battery is broken when there arises unusual heat generation on account of, for example, internal short circuit. The battery has a further disadvantage in that the cycle characteristics deteriorates rapidly at high temperatures and hence the battery lacks heat stability.

Under these circumstances, it has been proposed to convert the lithium cobalt composite oxide to such a substituted composite oxide in which a part of cobalt atoms are substituted for an element other than cobalt atom thereby to suppress undesired change of the crystal structure while the battery is subjected to charge-discharge cycles.

The substituted lithium cobalt composite oxide has heretofore been produced by dry-blending and pulverizing powders of raw materials such as lithium carbonate, cobalt carbonate and an oxide of an element to substitute in part the cobalt atoms or a substitution element, firing the resulting mixture, cooling, and then pulverizing the fired product, as described in, for example, Japanese Patent Application Laid-open No. 3-201368, No. 4-319259 or No. 5-283075.

However, according to such a method which employs a solid-state reaction using powders as reactants, it is difficult to obtain a uniform mixture of the powders having a particle size of a micron level. Moreover, since the thermal conductivities of the powders of carbonates or oxides which are usually used as raw materials are very low. Accordingly, for the production of practically usable composite oxides by firing such a mixture of powders of the raw materials, it is necessary to use a relatively large amount of powder of the substitution element and fire the resulting mixture for a long time at a high temperature followed by pulverizing the fired product. In addition, it is still necessary to repeat such firing and pulverizing operations so that the desired solid-state reaction is completed.

On the other hand, when such a mixture of powders containing a large amount of a compound of the substitution element is repeatedly fired at a high temperature, undesired by-products are often formed or the surface properties of the resultant product undesirably change with the result that lithium ion secondary batteries obtained using the resulting composite oxide as a cathode active material have a small cell capacity. Thus, the known composite oxides have failed to provide a high performance battery.

SUMMARY OF THE INVENTION

The invention has been accomplished to solve the problems involved in the known substituted lithium cobalt composite oxides for use as a cathode active material. Therefore, it is an object of the invention to provide a substituted lithium cobalt composite oxide which has not only uniform composition and improved heat stability but also excellent cycle characteristics and enables the manufacture of high capacity secondary batteries. It is a further object of the invention to provide a lithium ion secondary battery in which the substituted lithium cobalt complex oxide is incorporated as a cathode active material.

The invention provides a substituted lithium cobalt composite oxide for use as a cathode active material in a lithium ion secondary battery, which has the general formula:

$$Li_xM_yCo_{1-y}O_2 \qquad (I)$$

in which M represents at least one metallic element selected from the group consisting of Al, Ti, Mn, Mo and Sn etc.; x is a numeral in the range of 0.8 to 1.2; and y is a numeral in the range of 0.001 to 0.10.

According to the invention, the substituted lithium cobalt composite oxide is obtained by mixing powders of a lithium compound, a cobalt compound and a compound of the element M in an aliphatic lower alcohol of 1 to 3 carbon atoms as a solvent in such a molar ratio of the elements, Li, Co and M as is coincident to the above-mentioned general formula (I), drying the resulting mixture and firing the dried mixture at a temperature in the range of 600° C. to 1100° C. under an oxidative atmosphere.

The invention further provides a lithium ion secondary battery which makes use of the substituted lithium cobalt complex oxide as a cathode active material.

DESCRIPTION OF PREFERRED EMBODIMENTS OF THE INVENTION

The substituted lithium cobalt composite oxide of the invention for use as a cathode active material in a lithium ion secondary battery has the general formula:

$$Li_xM_yCo_{1-y}O \tag{I}$$

in which M represents at least one metallic element selected from the group consisting of Al, Ti, Mn, Mo and Sn; x is a numeral in the range of 0.8 to 1.2; and y is a numeral in the range of 0.001 to 0.10. That is, in the substituted lithium cobalt composite oxide of the invention, a part of the cobalt atoms is replaced with the element M (referred to hereunder as the substitution element).

In the substituted lithium cobalt composite oxide as represented by the general formula (I), x is a numeral preferably in the range of 0.9 to 1.1, most preferably x is equal to 1, and y is a numeral preferably in the range of 0.002 to 0.075, more preferably in the range of 0.005 to 0.05, most preferably in the range of 0.01 to 0.03.

When the value of y is 0.001 or less in the substituted lithium cobalt composite oxide as represented by the general formula (I), the resulting composite oxide is seldom improved in cycle characteristics and thermal stability, whereas when the value of y is 0.10 or more, the obtained composite oxide results in remarkable decrease in cell capacity, although the composite oxide is improved in cycle characteristics.

According to the invention, it is particularly preferred that the substitution element is at least one of Ti and Mn since the resulting substituted lithium cobalt composite oxide is excellent in initial discharge capacity, cycle characteristics and thermal stability, with Ti being most preferred. The use of Ti as a substitution element in an amount, for example, as small as 0.5 to 5 mol % (i.e., the value of y is 0.005 to 0.05), preferably as small as 1 to 3 mol % (i.e., the value of y is 0.01 to 0.03), provides a composite oxide for use a cathode active material improved in initial discharge capacity, cycle characteristics and thermal stability.

The substituted lithium cobalt composite oxide is obtained according to the invention by mixing powders of a lithium compound, a cobalt compound and a compound of the substitution element M in an aliphatic lower alcohol of 1 to 3 carbon atoms as a solvent in such a molar ratio of the elements, Li, Co and M as to meet the general formula (I), drying the resulting mixture and firing the dried mixture at a temperature in the range of 600° C. to 1100° C., preferably at a temperature in the range of 700° C. to 1000° C., under an oxidative atmosphere.

In the method as described above, lithium hydroxide, lithium oxide, lithium carbonate, or organic acid salts (such as formate, oxalate or acetate) is used as a lithium compound, and among these lithium carbonate or lithium hydroxide is preferred. On the other hand, oxides, hydroxides, oxyhydroxides, carbonates, nitrates, sulfates, chlorides or organic acid salts are used as a cobalt compound or a compound of the substitution element M. Among these, however, oxides, hydroxides or organic acid salts are preferred. These lithium compounds, cobalt compounds and the compounds of the substitution element M are used in the form of powder, but they are not specifically limited in their particle sizes.

For the production of the substituted lithium cobalt composite oxide $Li_xM_yCo_{1-y}O_2$ of the invention, powders of a lithium compound, a cobalt compound and a compound of the substitution element M are mixed together in a solvent of aliphatic lower alcohols so that the molar ratio of Li/M/Co is coincident to the above formula. The value of x is within 0.8–1.2 so that both stoichiometric and non-stoichiometric composite oxides are obtainable according to the invention.

The aliphatic lower alcohol usable includes, for example, methanol, ethanol, n-propanol and isopropanol, with methanol being particularly preferred among these. It is preferred that methanol contains no water, however, methanol may contain water in an amount of not more than 20% by weight.

According to the invention, the above-mentioned aliphatic lower alcohol is used as a solvent, and the starting powders are mixed therein so that the particles of compound of the substitution element M are uniformly dispersed almost as primary particles in the mixture.

The amount of the solvent used is not specifically limited, however, it is preferred that the amount of the solvent used is such that it forms paste when powders of a lithium compound, a cobalt compound and a compound of the substitution element M are mixed in the solvent.

The resulting paste is then heated and dried, and calcined or fired at a temperature in the range of 600° C. to 1100° C., preferably in the range of 700–1000° C., and most preferably in the range of 750–950° C., comparatively for a short time, usually for 0.5–10 hours, preferably for 0.5–5 hours, under an oxidative atmosphere, thereby providing the substituted lithium cobalt composite oxide of the invention.

It is preferred that the composite oxide has a primary particle size of 0.5–5 $\mu$m and a secondary particle size of 1–30 $\mu$m so that it provides a battery having superior characteristics.

When the paste of the mixture of the starting powders is fired, microwave heating equipment may be used if necessary in addition to electric furnaces. By way of example, the paste is heated and dried at a temperature of 100–350° C. with a microwave heating equipment and then fired at a temperature of 600–1000° C. with an electric furnace. This process provides the composite oxide promptly. If necessary, the paste may be heated and fired only with microwave heating equipment.

Alternatively, the paste of the mixture of the starting powders, after drying, may be fired at a temperature of 700–1000° C., preferably at a temperature of 750–950° C., under an oxidative atmosphere using a rotary kiln. This process permits continuous firing of the mixture with high productivity. That is, the process produces the substituted lithium cobalt composite oxide having excellent cycle characteristics by firing within one hour.

According to the invention, the use of the above mentioned substituted lithium cobalt composite oxide in which a part of cobalt atoms are replaced with the substitution element M other than cobalt as a cathode active material provides a secondary battery that has improved cycle characteristics and thermal stability. In particular, it is surprising that the replacement of only 5 mol % of cobalt atoms with a substitution element provides a secondary battery that has remarkably improved cycle characteristics and thermal stability. It is believed that this results from mixing the starting powders together in the specific alcohol solvent so that the compound of substitution element M is dispersed almost in the form of primary particles in the resulting mixture.

The lithium ion secondary battery of the invention comprises a cathode, an anode comprising lithium, lithium alloys or carbonaceous material which is capable of intercalating or deintercalating lithium ions, a separator interposed between the cathode and the anode, and lithium ion-conductive non-aqueous (organic) electrolyte. Such non-aqueous (organic) electrolyte lithium ion secondary batteries are already well known.

By way of example, a cathode for use in a coin type battery is prepared by mixing the above-mentioned cathode active material, an electrically conductive material and a binder to give a mixture, and molding the mixture under pressure to provide a disk-like cathode. As the electrically conductive material, graphite is used, for example, and as the binder, polytetrafluoroethylene is used, for example, among others. On the other hand, there are used as the anode a carbonaceous material which is capable of intercalating or deintercalating lithium ions. The shape of the anode is suitably determined depending upon the shape of cathode. The cathode and the anode may carry current collectors, if necessary.

The separator interposed between the cathode and the anode is comprised of, for example, nonwoven fabric formed of polyolefins such as polyethylene or polypropylene or, a porous film of polyolefin resins.

The lithium ion-conductive non-aqueous electrolyte is not limited to specific ones, but it is preferably such an electrolytic solution as is prepared by dissolving an electrolyte in an non-aqueous solvent. The non-aqueous solvent usable includes, for example, ethylene carbonate, propylene carbonate, butylene carbonate, dimethyl carbonate, diethylcarbonate, ethyl methyl carbonate, γ-butyrolactone, sulfolane, acetonitrile, 1,2-dimethoxyethane, 1,3-dimethoxypropane, dimethylether, tetrahydrofuran and 2-methyltetrahydrofuran. The solvent is used alone or as a mixture of two or more.

In turn, lithium salts are used as the lithium ion-conductive non-aqueous electrolyte, such as lithium perchlorate ($LiClO_4$), lithium hexafluorophosphate ($LiPF_6$), lithium borofluoride ($LiBF_4$), lithium hexafluoroarsenate ($LiAsF_6$), lithium trifluoromethane sulfonate and lithium aluminum chloride. The electrolyte usually has a concentration of 0.5–1.5 mol/L in the non-aqueous solvent.

A lithium ion-conductive solid electrolyte that can serve also as a separator may be used as an electrolyte in place of the combination of organic electrolytic solution and separator. Various kinds of such solid electrolytes are also already known.

Figure 1:
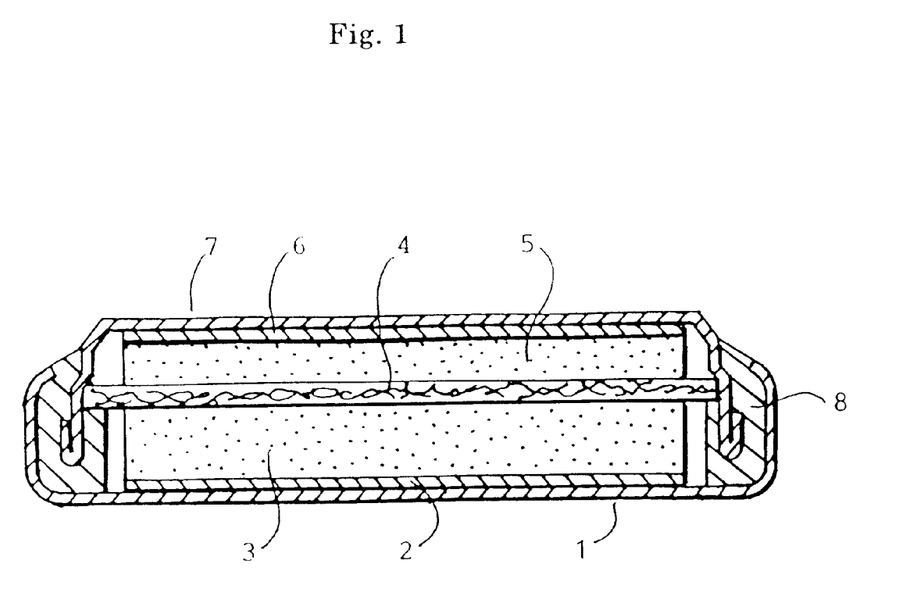
FIG. 1 is a cross section of an example of lithium secondary battery.

FIG. 1 shows an example of coin type lithium ion secondary battery. The secondary battery comprises a cathode can 1 formed of, for example, stainless steel, a cathode current collector 2 placed on the inside bottom of the cathode can, a disk-like cathode mounted on the cathode current collector, and a separator 4 placed on the cathode current collector. A disk-like anode 5 is mounted on the separator, and an anode current collector is interposed between the anode and an anode can 7 formed of stainless steel. The anode can is mounted to seal the opening of the cathode can with a packing 8 interposed between the cathode can and the anode can. The lithium ion-conductive electrolytic solution is retained usually in the separator.

As set forth above, according to the invention, the starting powders are mixed in the aliphatic lower alcohol so that particles of a compound of the substitution element M are uniformly dispersed almost as primary particles in the mixture, thereby forming a very uniform starting mixture. The starting mixture is then dried and fired at a predetermined temperature for a relatively short period of time under an oxidative atmosphere thereby providing the desired substituted lithium cobalt composite oxide.

Furthermore, unlike the conventional dry blending process, the process of the invention readily provides the desired substituted lithium cobalt composite oxide of higher quality and higher performance by firing at lower temperatures for shorter period of time without resorting repeated firing and pulverizing.

The lithium ion secondary battery having the composite oxide incorporated as a cathode active material has a high voltage of 4 V class, a high energy density and excellent charge and discharge cycle characteristics as well as excellent thermal stability.

The invention will now be described in more detail with reference to examples below, however, the invention is not limited thereto.

EXAMPLE 1

Lithium carbonate ($Li_2CO_3$), cobalt oxide ($Co_3O_4$) and titanium dioxide ($TiO_2$) were mixed in a Li/(Co+Ti) molar ratio of 1.0 and a Ti/(Co+Ti) molar ratio (=y) of 0, 0.005, 0.01, 0.03 or 0.10 in methanol and the resulting mixture was stirred to provide a paste. The paste was heated and dried, and then fired under an air atmosphere at a temperature of 900° C. for three hours with an electric furnace thereby providing titanium-substituted lithium cobalt composite oxide, $LiTi_yCo_{1-y}O_2$.

Eighty five parts by weight of the titanium-substituted lithium cobalt composite oxide were mixed with 10 parts by weight of graphite (electrically conductive material) and 5 parts by weight of polytetrafluoroethylene (binder) to provide a mixture. The mixture was molded under pressure to provide a disk-like cathode. A disk-like lithium metal was used as an anode. An electrolytic solution was prepared by dissolving lithium hexafluorophosphate ($LiPF_6$) in a mixture of ethylene carbonate and diethyl carbonate (having a volume ratio of 1:2) in a concentration of 1 mol/L. A microporous polypropylene film was used as a separator. These materials were assembled to a coin type lithium ion secondary battery as shown in FIG. 1.

The battery was charged to an upper limit voltage of 4.3 V at a current density of 1 mA/cm$^2$ at a temperature of 25° C. and then discharged to a lower limit voltage of 3.0 V at a current density of 2 mA/cm$^2$, and charge and discharge were repeated in this manner to examine cycle characteristics of discharge capacity of the battery.

Figure 2:
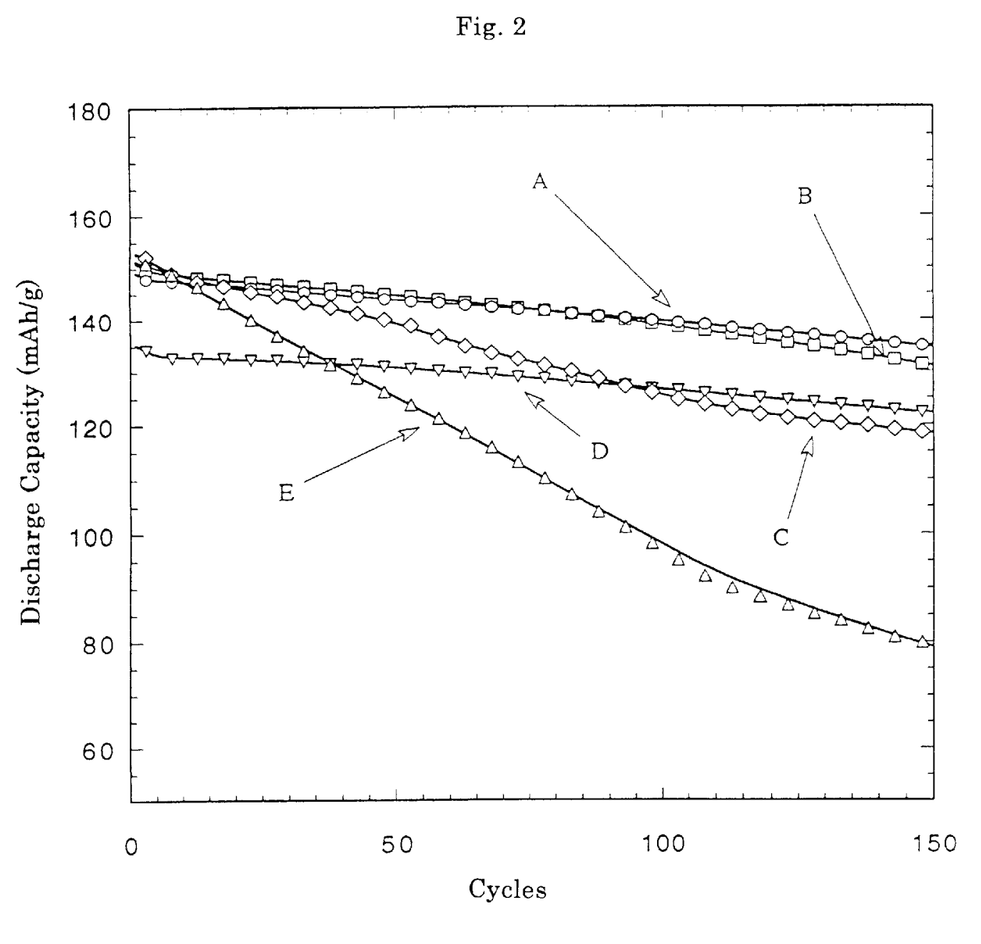
FIG. 2 is a graph showing the relation between the charge-discharge cycles of a lithium ion secondary battery having as a cathode active material a substituted lithium cobalt composite oxide of the invention in which titanium is substituted for cobalt in varied molar ratios and the discharge capacity of the battery.

The discharge capacity retention at the time of the 150th cycle of the lithium ion secondary battery is shown in Table 1. Composite oxides in which titanium atoms were substituted for cobalt atoms in varied substitution ratios were used as a cathode active material in the secondary battery. The discharge capacity retention is defined herein the invention by: (discharge capacity (V)/initial discharge capacity (V) at the time of the 150th cycle)×100 (%). FIG. 2 shows the relation between the charge-discharge cycles and the discharge capacity of the battery, in which A to E correspond to A to E, respectively, in Table 1.

TABLE 1

| Composite Oxide | Titanium Substitution (mol %) | Discharge Capacity Retention at the time of the 150th cycle (%) |
|---|---|---|
| C | 0.5 | 77.4 |
| B | 1.0 | 86.6 |
| A | 3.0 | 90.2 |
| D | 10 | 90.4 |
| E | 0 | 52.3 |

A battery which had a substituted lithium cobalt composite oxide in which 1 mol % of cobalt atoms were replaced with titanium atoms (i.e., $LiTi_{0.01}Co_{0.99}O_2$) and a battery which had a lithium cobalt composite oxide with no substitution (i.e., $LiCoO_2$) were prepared. Each of the battery was fully charged to a voltage of 4.3 V at a current of 1 C (under the constant current and constant voltage charge conditions) for three hours, and then the cathode was taken out of the battery, washed with diethyl carbonate and dried in vacuo.

Figure 3:
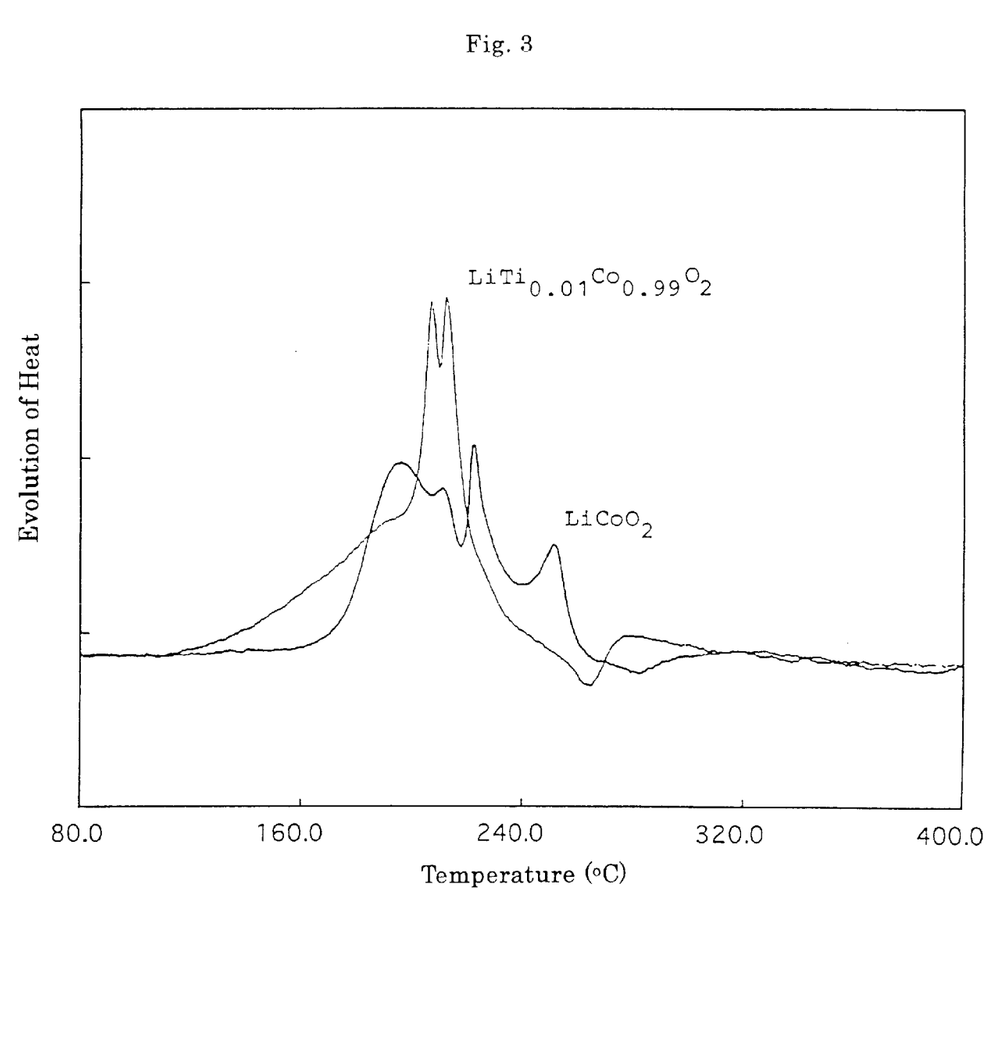
FIG. 3 is a graph showing DSC curves of a cathode comprised of titanium-substituted lithium cobalt composite oxide of the invention and of a cathode comprised of non-substituted lithium cobalt composite oxide as a comparative example.

An electrolytic solution was prepared by dissolving lithium hexafluorophosphate ($LiPF_6$) in a mixture of ethylene carbonate and diethyl carbonate (having a volume ratio of 1:1) in a concentration of 1 mol/L and was added to the cathode. The resulting cathode was subjected to DSC analysis (differential scanning calorimetric analysis). The results are shown in FIG. 3.

The DSC curve of the cathode comprising the lithium cobalt composite oxide with no titanium substitution, i.e., $LiCoO_2$, showed steep rise about at 180° C., that is, abrupt heat generation. In contrast, the DSC curve of the cathode comprising the titanium-substituted lithium cobalt composite oxide, i.e., $LiTi_{0.01}Co_{0.99}O_x$, showed heat generation about at 140° C. However, the curve had no steep rise and formed peaks very gently. The heat generation peaks were also found to shift toward higher temperatures.

Accordingly, the cathode comprising the titanium-substituted lithium cobalt composite oxide has improved heat stability compared with the cathode comprising the lithium cobalt composite oxide with no titanium substitution.

EXAMPLE 2

Lithium carbonate ($Li_2CO_3$), cobalt oxide ($Co_3O_4$) and manganese acetate (($CH_3COO)_2Mn$) were mixed in a Li/(Co+Mn) molar ratio of 1.0 and a Mn/(Co+Mn) molar ratio (=y) of 0.01 in methanol and the resulting mixture was stirred to provide a paste. The paste was heated and dried, and then fired under an air atmosphere at a temperature of 900° C. for three hours with an electric furnace thereby providing manganese-substituted lithium cobalt composite oxide, $LiMn_{0.01}Co_{0.99}O_2$.

In the same manner as above except that aluminum oxide, molybdenum oxide or stannic oxide was used in place of manganese acetate in an amount of 1 mol % based on cobalt atoms, aluminum-, molybdenum- or tin-substituted lithium cobalt composite oxide was prepared, respectively.

Figure 4:
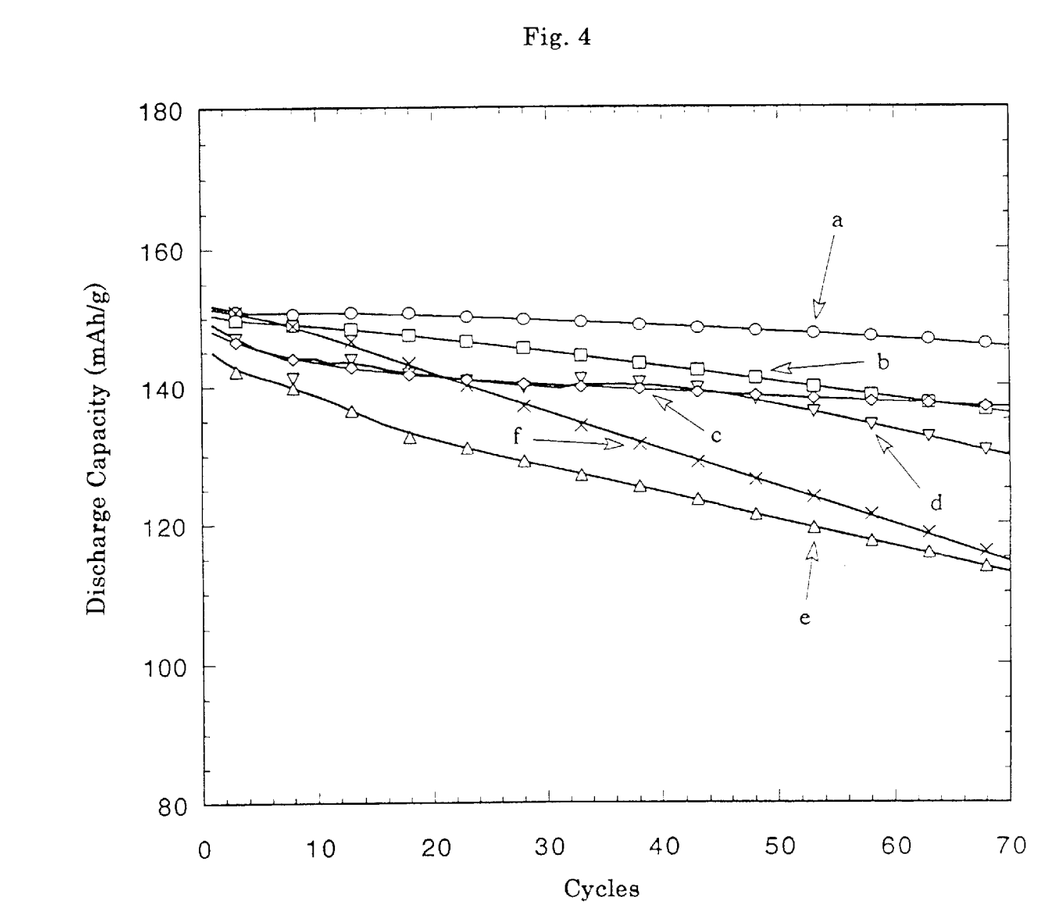
FIG. 4 is a graph showing the relation between the charge-discharge cycles of a lithium ion secondary battery having as a cathode active material a lithium cobalt composite oxide of the invention in which various elements are substituted for cobalt in an amount of 1 mol % and the discharge capacity of the battery.

Using these substituted lithium cobalt composite oxides, coin type lithium ion secondary batteries were assembled in the same manner as in Example 1, and the initial discharge capacity and the discharge capacity retention at the time of the 70th cycle of the batteries were measured in the same manner as in Example 1. In addition, the battery prepared in Example 1 having a cathode comprised of titanium-substitution lithium cobalt composite oxide was also subjected to measurement of the initial discharge capacity and the discharge capacity retention at the time of the 70th cycle in the same manner. The results are shown in Table 2. FIG. 4 shows the relation between the charge-discahrge cycle and the discharge capacity of the battery, in which a to f correspond to a to f, respectively, in Table 2.

TABLE 2

| Composite Oxide | Substitution Element*) | Initial Discharge Capacity (mAh/g) | Discharge Capacity Retention at the time of the 70th cycle (%) |
|---|---|---|---|
| a | Ti | 151.8 | 96.1 |
| b | Mn | 150.4 | 90.4 |
| d | Al | 148.0 | 92.4 |
| d | Mo | 149.1 | 87.0 |
| e | Sn | 145.0 | 77.8 |
| f | — | 151.3 | 75.9 |

Notes: *)A substitution element was substituted for cobalt atoms in an amount of 1 mol %.

EXAMPLE 3

Lithium carbonate ($Li_2CO_3$), cobalt oxide ($Co_3O_4$) and titanium dioxide ($TiO_2$) were mixed in a Li/(Co+Ti) molar ratio of 1.0 and a Ti/(Co+Ti) molar ratio (=y) of 0.01 in methanol and the resulting mixture was stirred to provide a paste. The paste was heated and dried, and then fired under an air atmosphere at a temperature of 900° C. for three hours with an electric furnace thereby providing titanium-substituted lithium cobalt composite oxide, $LiTi_{0.01}Co_{0.99}O_2$.

A coin type lithium ion secondary battery was assembled in the same manner as in Example 1 except that a disk-like cathode prepared by using the thus prepared titanium-substituted lithium cobalt composite oxide was used.

The battery was subjected to the measurement of performance in the same manner as in Example 1 to show that the initial discharge capacity was found to be 148.8 mAh/g and the discharge capacity and its retention at the time of the 100th cycle were found to be 132.1 mAh/g and 88.8%, respectively.

EXAMPLE 4

Figure 5:
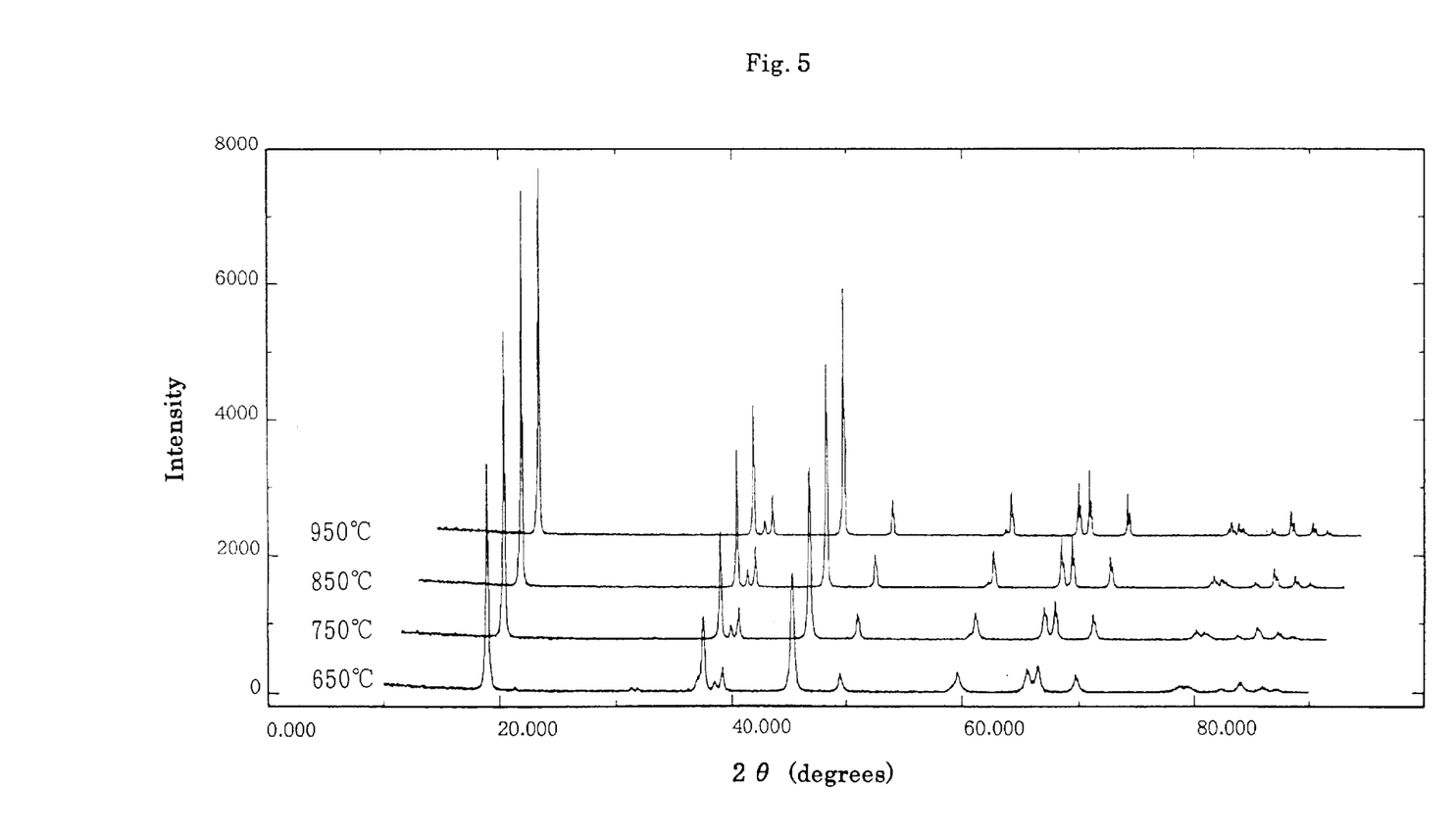
FIG. 5 is an X-ray diffraction diagram of products prepared by mixing lithium carbonate, cobalt oxide and titanium dioxide in a Li/(Co+Ti) molar ratio of 1.0 and a Ti/(Co+Ti) molar ratio (=y) of 0.01 in methanol, drying and pulverizing the resulting paste, and firing the resulting powder at varied temperatures with a rotary kiln.

Lithium carbonate ($Li_2CO_3$), cobalt oxide ($Co_3O_4$) and titanium dioxide ($TiO_2$) were mixed in a Li/(Co+Ti) molar ratio of 1.0 and a Ti/(Co+Ti) molar ratio (=y) of 0.01 in methanol and the resulting mixture was stirred to provide a paste. The paste was heated and dried, and the resulting powder was charged in a rotary kiln, and fired under an air atmosphere at a temperature of 650° C., 750° C., 850° C. or 950° C. for 40 minutes. The X-ray diffraction diagram of the resulting fired products are shown in FIG. 5. It is shown that the firing of the powder at a temperature of 750° C. for 40 minutes provided titanium-substituted lithium cobalt composite oxide, $LiTi_{0.01}Co_{0.99}O_2$.

The same paste as mentioned above was heated and dried, and the resulting powder was charged in a rotary kiln, and fired under an air atmosphere at a temperature of 775° C.,

795° C. or 845° C. for 40 minutes to prepare titanium-substituted lithium cobalt composite oxide, $LiTi_{0.01}Co_{0.99}O_2$.

Ninety parts by weight of the titanium-substituted lithium cobalt composite oxide were mixed with 4 parts by weight of graphite (electrically conductive material) and 6 parts by weight of polytetrafluoroethylene (binder) to provide a mixture. The mixture was molded under pressure to provide a disk-like cathode. A disk-like lithium metal was used as an anode. An electrolytic solution was prepared by dissolving lithium hexafluorophosphate ($LiPF_6$) in a mixture of ethylene carbonate and diethyl carbonate (having a volume ratio of 1:2) in a concentration of 1 mol/L. A microporous polypropylene film was used as a separator. These materials were assembled to a coin type lithium ion secondary battery as shown in FIG. 1.

Figure 6:
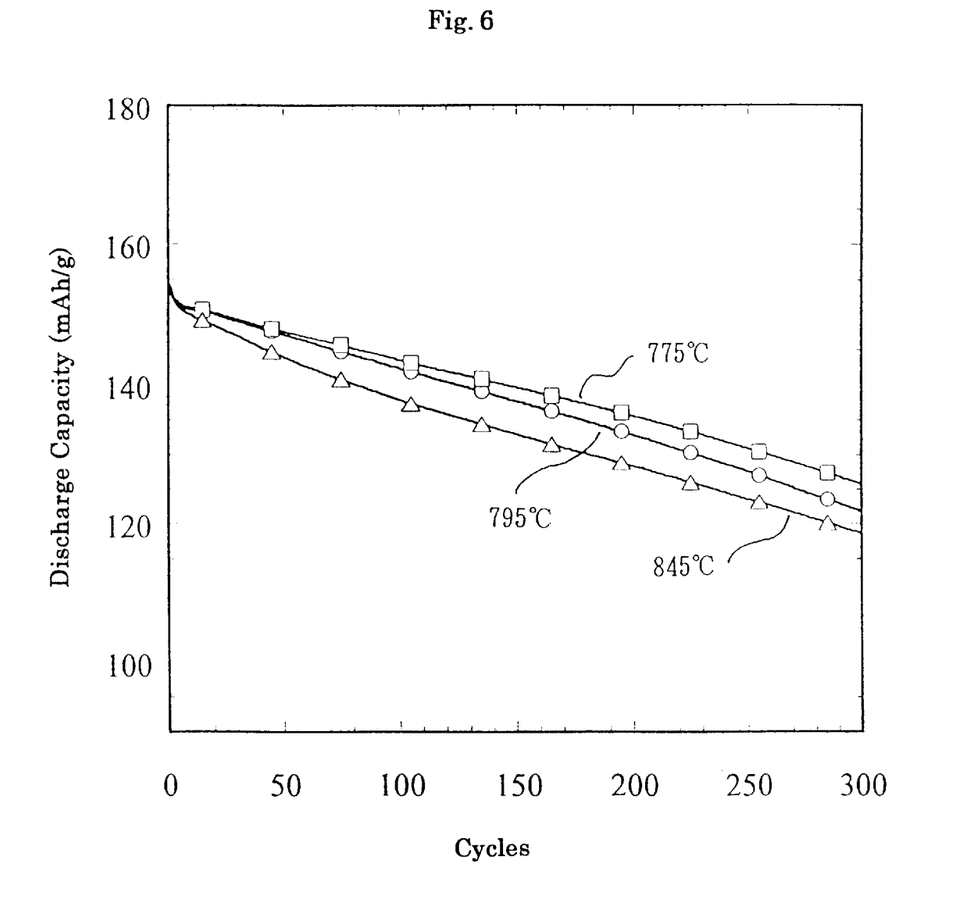
FIG. 6 is a graph showing the relation between the charge-discharge cycles of a lithium ion secondary battery having as a cathode active material titanium-substituted lithium cobalt composite oxide, $LiTi_{0.01}Co_{0.99}O_2$, prepared by firing a powder of starting materials with a rotary kiln.

The battery was charged and discharged repeatedly in the same manner as in Example 1 to examine cycle characteristics of discharge capacity of the battery. FIG. 6 shows the relation between the charge-discharge cycles and the discharge capacity of the battery. As shown in FIG. 6, a lithium ion secondary battery having a cathode active material prepared by using the titanium-substituted lithium cobalt composite oxide by firing at a temperature of 775° C., 795° C. and 845° C. had a discharge capacity retention of 81.5%, 7 9.3% and 77.5%, respectively, at the time of 300th cycle.

What is claimed is:

1. A non-aqueous electrolyte lithium ion secondary battery comprising a cathode, an anode comprising lithium, a lithium alloy or carbonaceous material which can intercalate or deintercalate lithium ions, a separator interposed between the cathode and the anode, and a lithium ion-conductive non-aqueous electrolyte, in which the cathode comprises as a cathode active material a substituted lithium cobalt composite oxide which has the general formula:

$$Li_xM_yCo_{1-y}O_2$$

in which M represents at least one metallic element selected from the group consisting of Ti and Mo; x is in the range of 0.8 to 1.2; and y is in the range of 0.001 to 0.10, an electrically conductive material and a binder, wherein the substituted lithium cobalt composite oxide is such that it is prepared by mixing powders of a lithium compound, a cobalt compound and a compound of the substitution element M in methanol in such a molar ratio of the elements, Li, Co and M as to meet the general formula, to prepare a mixture in the form of paste, drying the resulting mixture and firing the dried mixture at a temperature in the range of 600° C. to 1100° C. under an oxidative atmosphere.

2. The non-aqueous electrolyte lithium ion secondary battery as claimed in claim 1, wherein y is in the range of 0.002 to 0.05.

3. The non-aqueous electrolyte lithium ion secondary battery as claimed in claim 1, wherein M is Ti.

4. The non-aqueous electrolyte lithium ion secondary battery as claimed in claim 1, wherein the lithium compound is lithium carbonate or lithium hydroxide.

5. The non-aqueous electrolyte lithium ion secondary battery as claimed in claim 1, wherein the cobalt compound is cobalt oxide.

6. The non-aqueous electrolyte lithium ion secondary battery as claimed in claim 1, wherein the binder comprises polytetrafluoroethylene.

* * * * *